United States Patent [19]

Bergstrom et al.

[11] Patent Number: 5,468,829
[45] Date of Patent: Nov. 21, 1995

[54] IN-SITU REINFORCED SILICONE ELASTOMER USING RESIN PRECURSOR

[75] Inventors: Debora F. Bergstrom; Gary T. Burns; Patricia A. Giwa-Agbomeirele, all of Midland, Mich.

[73] Assignee: Dow Corning Corporation, Midland, Mich.

[21] Appl. No.: 321,569

[22] Filed: Oct. 11, 1994

[51] Int. Cl.$^6$ .................................................. C08G 77/06
[52] U.S. Cl. .............................. 528/18; 528/35; 528/37; 524/477
[58] Field of Search .............................. 525/477; 528/35, 528/18, 37

[56] References Cited

U.S. PATENT DOCUMENTS

| | | | |
|---|---|---|---|
| 3,509,081 | 4/1970 | Gignac | 260/18 |
| 4,341,842 | 7/1982 | Lampe | 428/450 |
| 4,525,400 | 6/1985 | Surprenant | 428/54 |
| 4,652,624 | 3/1987 | Allen et al. | 528/17 |
| 5,395,908 | 3/1995 | Bergstrom et al. | 528/18 |

OTHER PUBLICATIONS

Mark et al., Markromol. Chem. Rapid Commun. 3:681–685 (1982).
Jaing et al., Colloid & Polymer Sci. 262:758–760 (1984).
Mark et al., Macromolecules 17:2613–2616 (1984).
Tang et al., Polymer Engineering and Science 25:29–31 (1985).
Ning et al., Polymer Bulletin 13:155–161 (1985).
Mark et al., Polymer Bulletin 14:325–329 (1985).
Sur et al., Makromol. Chem. 187:2861–2866 (1986).

*Primary Examiner*—Melvyn I. Marquis
*Assistant Examiner*—Margaret W. Glass
*Attorney, Agent, or Firm*—William F. Boley

[57] ABSTRACT

A method for preparing in situ reinforced silicone elastomers and the compositions prepared by the method. The method comprises forming a mixture comprising an end-functional diorganopolysiloxane; a stoichiometric excess of a hydrolyzable siloxane having hydrolyzable functionality described by formula— $R^2SiQ_{3-b}R_b$, were each R is independently selected from a group consisting of alkyls comprising one to six carbon atoms, alkenyls comprising two to six carbon atoms, and aryls, $R^2$ is a divalent hydrocarbon radical comprising one to 12 carbon atoms, each Q is independently selected from a group consisting of hydroxy, acyloxys comprising one to six carbon atoms, alkoxys comprising one to six carbon atoms, and substituted alkoxys comprising one to six carbon atoms, and b=0 to 2; and a tin salt catalyst and contacting the mixture with water to effect curing. The resulting silicone elastomers are in situ reinforced to provide high strength.

17 Claims, No Drawings

IN-SITU REINFORCED SILICONE ELASTOMER USING RESIN PRECURSOR

BACKGROUND OF INVENTION

The present invention is a method for preparing in situ reinforced silicone elastomers and the compositions prepared by the method. The method comprises forming a mixture comprising an end-functional diorganopolysiloxane; a stoichiometric excess of a hydrolyzable siloxane having hydrolyzable functionality described by formula $-R^2SiQ_{3-b}R_b$, were each R is independently selected from a group consisting of alkyls comprising one to six carbon atoms, alkenyls comprising two to six carbon atoms, and aryls, $R^2$ is a divalent hydrocarbon radical comprising one to 12 carbon atoms, each Q is independently selected from a group consisting of hydroxy, acyloxys comprising one to six carbon atoms, alkoxys comprising one to six carbon atoms, and substituted alkoxys comprising one to six carbon atoms, and b=0 to 2; and a tin salt catalyst and contacting the mixture with water to effect curing. The resulting silicone elastomers are in situ reinforced to provide high strength.

It is known that crosslinked diorganopolysiloxanes must be reinforced with suitable fillers to obtain silicone elastomers with desirable mechanical properties such as high tensile strength and elongation. A typical filler used for this purpose is pyrogenic silica. The manufacture of pyrogenic silica for this purpose is an energy intensive process resulting in costs that are reflected in the cost of the resulting silicone elastomer. In addition, mixing of silica particles into viscous polymers, such as for the preparation of high-consistency elastomers, requires significant energy and time and gives products with properties which are highly dependent on the mixing process.

In the present method the reinforcing filler is generated in situ, thus avoiding the expense of externally forming the reinforcing filler and the expense, time, and variability associated with mixing the reinforcing filler into the diorganopolysiloxanes. Use of the hydrolyzable siloxane compositions described herein to in situ reinforce silicone elastomers provides a method of controlling the tensile strength, elongation, and durometer properties of the elastomer without the separate addition of reinforcing filler.

Mark et al., Makromol. Chem. Rapid Commun. 3:681–685 (1982), describe a two-step process where silanol end-blocked polydimethylsiloxane (PDMS) or vinyl end-blocked PDMS are end-linked to form elastomeric matrices. The end-linked elastomeric matrices are then swollen with tetraethoxysilane (TEOS) and the absorbed TEOS hydrolyzed in place by immersion of the sample into glacial acetic acid.

Jaing et al., Colloid & Polymer Sci. 262:758–760 (1984), used the same two-step process as described by Mark et al., supra, but rather than hydrolyzing the TEOS in acetic acid used a constant relative humidity chamber to cure the TEOS in situ.

Subsequently, Mark et al., Macromolecules 17:2613–2616 (1984), described a one-step or simultaneous curing in an in situ filling process. In the process, silanol end-blocked PDMS, TEOS, and tin catalyst were mixed at various TEOS to PDMS ratios and cured using atmospheric moisture. The tin catalyst used were dibutyltin diacetate and stannous (II) ethylhexanoate.

Tang et al., Polymer Engineering and Science 25:29–31 (1985), describe a one-step simultaneous curing and filling method where a bimodal mixture of silanol end-terminated PDMS including one long and one short chain polymer fraction was combined with stannous(II) ethylhexanoate and various amounts of TEOS and cured using atmospheric moisture.

Ning et al., Polymer Bulletin 13:155–161 (1985), reported using trifunctional silanes to form resinous reinforcing phases in a two-step process. In this work, a vinyl-terminated PDMS was tetrafunctionally end-linked and then swollen with various amounts of TEOS, ethyltriethoxysilane, or diethyldiethoxysilane and combination of these alkoxysilanes. Precipitation of the alkoxysilanes to form the silica or silicate resin was done by immersion of test samples into an aqueous solution of ethyl amine.

Mark et al., Polymer Bulletin 14:325–329 (1985), report using trifunctional silanes as precursors to form trifunctional silicate resins in a simultaneous one-step curing and filling process. Mark et al. report mixing silanol end-terminated PDMS and stannous(II) ethylhexanoate with either vinyltriethoxysilane, methyltriethoxysilane, or phenyltriethoxysilane at various alkoxysilane to PDMS ratios and curing samples under atmospheric conditions.

Sur et al., Makromol. Chem. 187:2861–2866 (1986), report a two-step process where silanol-terminated PDMS is end-linked and then swollen with either tetramethoxysilane, TEOS, tetrapropoxysilane, or tetrabutoxysilane. The samples were cured by immersion in aqueous solutions containing one of a variety of amine catalysts.

Lampe, U.S. Patent No. 4,341,842, issued Jul. 27, 1982, reports a silicone rubber composition having (A) 100 parts of a silanol end-stopped diorganopolysiloxane polymer with a viscosity varying from 100 to 500,000 centipoise at 25° C., (B) from 0.1 to 15 parts by weight of an alkyl silicate or partial hydrolysis product of the silicate, and (C) from 0.01 to 5 parts by weight of a metal salt of a carboxylic acid, where the composition is cured at room temperature to a silicone elastomer.

SUMMARY OF INVENTION

The present invention is a method for preparing in situ reinforced silicone elastomers and the compositions prepared by the method. The method comprises forming a mixture comprising an end-functional diorganopolysiloxane; a stoichiometric excess of a hydrolyzable siloxane having hydrolyzable functionality described by formula $-R^2SiQ_{3-b}R_b$, were each R is independently selected from a group consisting of alkyls comprising one to six carbon atoms, alkenyls comprising two to six carbon atoms, and aryls, $R^2$ is a divalent hydrocarbon radical comprising one to 12 carbon atoms, each Q is independently selected from a group consisting of hydroxy, acyloxys comprising one to six carbon atoms, alkoxys comprising one to six carbon atoms, and substituted alkoxys comprising one to six carbon atoms, and b=0 to 2; and a tin salt catalyst and contacting the mixture with water to effect curing. The resulting silicone elastomers are in situ reinforced to provide high strength.

DESCRIPTION OF INVENTION

The present invention is a method for preparing in situ reinforced silicone elastomers and silicone elastomers prepared by the method. The method comprises:

(A) forming a mixture comprising a diorganosiloxane polymer described by formula $$Q_{3-a}R_aSi(OSiR_2)_xOSiR_aQ_{3-a}, \qquad (1)$$

a stoichiometric excess of a hydrolyzable siloxane selected from a group consisting of hydrolyzable siloxanes described by formulas $$R^3Si(OSiQ^1R)_m(OSiRR^1)_nOSiR_3, \quad (2)$$

$$(RQ^1SiO)_y, \text{ and} \quad (3)$$

$$Si(OSiR_2Q^1)_4 \quad (4)$$

and a tin salt catalyst and (B) contacting the mixture with water to effect curing of the mixture to form an in situ reinforced silicone elastomer;

where each R is independently selected from a group consisting of alkyls comprising one to six carbon atoms, alkenyls comprising two to six carbon atoms, and aryls; each $R^1$ is independently selected from a group consisting of hydrogen and R; each Q is independently selected from a group consisting of hydroxy, acyloxys comprising one to six carbon atoms, alkoxys comprising one to six carbon atoms, and substituted alkoxys comprising one to six carbon atoms; each $Q^1$ is independently selected from a group described by formula $$-R^2SiQ_{3-b}R_b, \quad (5)$$

where $R^2$ is a divalent hydrocarbon radical comprising one to 12 carbon atoms, R is as previously described, and Q is as previously described, and b=0 to 2; a=0 to 2, x=0 to 1000, m=3 to 500, n=0 to 497, m+n=3 to 500, and y=3 to 10.

The method of forming the mixture comprising the diorganosiloxane polymer, the hydrolyzable siloxane, and a tin salt catalyst is not critical to the present process and can be any such processes known to those skilled in the art. For example, the mixture can be formed in a standard mixer or blender. This mixture can then be, for example, extruded, molded; or dip-coated, wiped, or sprayed on to a substrate.

The present method requires a diorganosiloxane polymer as described by formula (1). The diorganosiloxane polymer contains substituent R, where each R is independently selected from a group consisting of alkyls comprising one to six carbon atoms, alkenyls comprising two to six carbon atoms, and aryls. The substituent R can be, for example, methyl, ethyl, propyl, tertbutyl, hexyl, 1,1,1-trifluoropropyl, perfluoropropyl, phenyl, xylyl, and naphthyl. Preferred is where in formula (1) R is methyl.

The diorganosiloxane polymer also contains on each end one, two, or three substituents Q, where each Q is a reactive functionality independently selected from a group consisting of hydroxy, acyloxys comprising one to six carbon atoms, alkoxys comprising one to six carbon atoms, and substituted alkoxys comprising one to six carbon atoms. The substituent Q can be, for example, hydroxy, methoxy, ethoxy, butoxy, acetoxy, and 1,1,1-trifluoropropoxy. Preferred is when Q is hydroxy. More preferred is when Q is hydroxy and each a equals two.

The diorganosiloxane polymer comprises x number of repeating units of formula $-(OSiR_2)-$, where R is as previously described and x=0 to 1000. Preferred is where x is a value within a range of about 10 to 1000. Most preferred is where x is a value within a range of about 20 to 800.

The diorganosiloxane polymer is mixed with a stoichiometric excess of a hydrolyzable siloxane described by formulas (2), (3), and (4), or their partial hydrolyzate. The hydrolyzable siloxane serves as a crosslinker for the diorganosiloxane polymer and as a source material for the in situ formation of filler within the matrices of the crosslinked diorganosiloxane polymer.

The hydrolyzable siloxanes have substituents R, where R is as previously described. Preferred is when R is methyl.

The hydrolyzable siloxanes have substituent $Q^1$, where each $Q^1$ is independently selected from a group described by formula (5). In formula (5), the substituent $R^2$ is a divalent hydrocarbon radical comprising one to 12 carbon atoms. Preferred is when $R^2$ is an alkylene radical comprising two to six carbon atoms. Most preferred is when $R^2$ is ethylene. In formula (5), the substituents Q and R are as previously described and b=0, 1, or 2. In formula (5) it is preferred that Q be an alkoxy comprising one to six carbon atoms. More preferred is when Q is methoxy. In formula (5) it is preferred that b=0.

Hydrolyzable siloxanes described by formula (2) can have m number of repeating units described by formula $-(OSiQ^1R)-$, where $Q^1$ and R are as previously described and m is an integer within a range of about three to 500. Hydrolyzable siloxanes described by formula (2) can have n number of repeating units described by formula $-(OSiRR^1)-$ where R is as previously described, each $R^1$ is independently selected from a group consisting of R and hydrogen, and n is an integer within a range of about zero to 497. In formula (2) the sum of m plus n can equal three to 500. Preferred is when each $R^1$ of formula (2) is independently selected from a group consisting of methyl and hydrogen.

Formula (3) describes hydrolyzable cyclosiloxanes having substituents R and $Q^1$ as previously described and y number of repeating units, where y is an integer within a range of about 3 to 10. The preferred cyclosiloxane is one where y is within a range of about four to six.

In formula (4), the R and $Q^1$ substituents of the hydrolyzable siloxane are as previously described.

By "stoichiometric excess" of hydrolyzable siloxane it is meant that the number of Q substituents provided to the method by addition of the hydrolyzable siloxane is greater than the number of Q substituents provided to the method by the diorganosiloxane polymer. It is preferred that the hydrolyzable siloxane be added to the method at a concentration where the amount of Q substituents provided to the method by the hydrolyzable siloxane is about five to ten times stoichiometric excess in relation to the Q substituents added to the method by the diorganosiloxane polymer.

The hydrolyzable siloxanes useful in the present method can be prepared, for example, by the hydrosilation of organohydrogensiloxane polymers, oligomers, cyclic or branched compounds with alkene-substituted hydrolyzable silanes such as vinyltrimethoxysilane. The hydrosilation process can be conducted in the presence of a platinum or platinum complex catalyst. The hydrosilation catalyst can be, for example, a complex of platinum with sym-divinyltetramethylsiloxane.

The mixture comprising the diorganosiloxane polymer and the hydrolyzable siloxane also comprises a tin salt catalyst. The tin salt catalyst can be any such catalyst which facilitates the crosslinking of the diorganopolysiloxane polymer by the hydrolyzable siloxane, facilitates the condensing of the hydrolyzable siloxane to form an in situ filler, or facilitates both. The tin salt catalyst can be, for example, dibutyltin dilaurate, dibutyltin dibenzoate, dibutyltin diacetate, or stannous(II) ethylhexanoate. A preferred tin salt catalyst is dibutyltin dilaurate.

The concentration of tin salt catalyst in the present method can be within a range of about 0.005 to 10 weight percent of the combined weight of the catalyst, the diorganosiloxane polymer, and the hydrolyzable siloxane added to the method. Preferred is when the concentration of the tin salt catalyst is within a range of about 0.01 to 2 weight percent of the combined weight as described.

The mixture comprising the diorganosiloxane, the hydrolyzable siloxane, and the tin salt catalyst is contacted with water to effect curing of the mixture to an in situ reinforced silicone elastomer. The present method requires the presence of water to effect crosslinking of the diorganosiloxane polymers by the hydrolyzable siloxane and to effect in situ filler formation by stoichiometric excess hydrolyzable siloxane. The water can be provided to the method in liquid or vapor form.

For example, the mixture comprising the diorganosiloxane polymer, the hydrolyzable siloxane, and the tin salt catalyst can be cured in an environment having a relative humidity within a range of about 20 percent to about 100 percent. Preferred is when the mixture is cured in an environment having a relative humidity within a range of about 30 percent to 70 percent.

The silicone elastomers prepared by the present method cure readily at room temperature. However, any temperature within a range of greater than about 0° C. to 100° C. is suitable for conducting the present method. Preferred is when the method is conducted at a temperature within a range of about 20° C. to 30° C.

The silicon elastomers prepared by the present method are unique elastomers having high tensile strength, typically above about 500 psi (3448 KPa). This high tensile strength is achieved without the addition of externally generated reinforcing fillers. In addition, the type of hydrolyzable siloxane can be varied as a means of altering such physical properties as elongation and durometer while still maintaining tensile strength. Therefore, also claimed herein are silicone elastomer compositions prepared by the present method.

The following examples are provided to illustrate the present invention. These examples are not intended to limited the scope of the present claims.

EXAMPLE 1

An in situ filled silicone elastomer was prepared using methyl(trimethoxysilylethyl)cyclosiloxane as a precursor for in situ filler formation in the elastomer.

A mixture of three silanol end-terminated polydimethylsiloxane polymers comprising by weight 25 percent polymer of Mn=2,700, 25 percent polymer of Mn=38,000, and 50 percent of polymer of Mn=58,000 was formed. This mixture was further mixed with 10.6 mole percent of methyl(trimethoxysilylethyl)cyclosiloxanes described by formula $\{Me\{(MeO)_3SiCH_2CH_2\}SiO\}_{4-6}$ and 0.2 weight percent dibutyltin dilaurate. The mixture was poured into 15×100 mm chases and placed in a constant relative humidity chamber at about 50 percent relative humidity to effect curing. The cured samples were tested for tensile strength and elongation according to ASTM Standard D12-87. The Shore A durometer was determined by standard techniques. The cured silicone elastomer was determined to have a tensile strength of 579 psi (3992 KPa), elongation of 70 percent, and Shore (A) durometer of 60.

EXAMPLE 2

An in situ filled silicone elastomer was prepared as described in Example 1 using one-half the amount of methyl(trimethoxysilylethyl)cyclosiloxane (i.e. 5.3 mole percent). Physical properties of the cured elastomer were determined by the methods described in Example 1. The cured elastomer had a tensile strength of 845 psi (5826 KPa), elongation of 253 percent, and Shore (A) durometer of 37.

EXAMPLE 3

An in situ filled silicone elastomer was prepared as described in Example using 0.08 weight percent tin octoate. Physical properties of the cured elastomer were determined by the methods described in Example 1. The cured elastomer had a tensile strength of 285 psi (1965 KPa), elongation of 41 percent, and Shore (A) durometer of 64.

EXAMPLE 4

An in situ filled silicone elastomer was prepared using a methyl(trimethoxysilylethyl)/methylhydrogen linear siloxane polymer as precursor for in situ filler formation in the elastomer. A diorganosiloxane polymer mixture similar to that described in Example 1 was formed. Into the diorganosiloxane polymer mixture was mixed about 13.2 weight percent of a methyl(trimethoxysilylethyl)/methylhydrogen linear siloxane polymer described by the following formula: $Me_3SiO\{Me\{(MeO)_3SiCH_2Ch_2\}SiO\}_{35}\{MeHSiO\}_{35}SiMe_3$. About 0.2 weight percent of dibutyltin dilaurate was stirred into the siloxane mixture and the mixture cured as described in Example 1 to form an in situ reinforced silicone elastomer. Physical properties of the silicone elastomer were determined by the methods described in Example 1. The silicone elastomer had a tensile strength of 848 psi (5847 KPa), elongation of 203 percent, and Shore (A) durometer of 39.

EXAMPLE 5

An in situ filled silicon elastomer was prepared using a branched methyl(trimethoxysilylethyl)siloxane as a precursor for in situ filler formation in the elastomer. A diorganosiloxane polymer mixture similar to that described in Example 1 was formed. Into the diorganosiloxane polymer mixture was mixed about 13.2 weight percent of a branched methyl(trimethoxysilylethyl)siloxane described by the following formula: $Si\{OSiMe_2\{CH_2Ch_2Si(MeO)_3\}\}_4$. The resulting mixture was catalyzed, cured, and physical properties determined as described in Example 1. The silicone elastomer had a tensile strength of 876 psi (6040 KPa), elongation of 86 percent, and Shore (A) durometer of 58.

EXAMPLE 6.

A composition similar to that described in Example 5 was cured using 0.2 weight percent tin octoate as catalyst. Physical properties of the resulting silicone elastomer were determined as described in Example 1. The silicone elastomer had a tensile strength of 677 psi (4668 KPa), elongation of 53 percent, and Shore (A) durometer of 57.

We claim:

1. A method for preparing an in situ reinforced silicone elastomer, the method comprising:

(A) forming a mixture comprising a diorganosiloxane polymer described by formula $Q_{3-a}R_aSi(OSiR_2)_xOSiR_aQ_{3-a}$, a five to 10 time stoichiometric excess of a hydrolyzable siloxane described by formulas $R_3Si(OSiQ^1R)_m(OSiRR^1)_nOSiR_3$, $(RQ^1SiO)_y$, and $$Si(OSiR_2Q^1)_4$$

and a tin salt catalyst and (B) contacting the mixture with water effecting formation of an in situ reinforced silicone elastomer;

where each R is independently selected from a group consisting of alkyls comprising one to six carbon atoms, alkenyls comprising two to six carbon atoms, and aryls; each $R^1$ is independently selected from a group consisting of hydrogen and R; each Q is independently selected from a group consisting of hydroxy, acyloxys comprising one to six carbon atoms, alkoxys comprising one to six carbon atoms, and substituted alkoxys comprising one to six carbon atoms; each $Q^1$ is independently described by formula $$-R^2SiQ_{3-b}R_b,$$

where $R^2$ is a divalent hydrocarbon radical comprising one to 12 carbon atoms, R is as previously described, Q is as previously described, and b=0 to 2; a=0 to 2, x=0 to 1000, m=3 to 500, n=0 to 497, m+n=3 to 500, and y=3 to 10.

2. A method according to claim 1, where each R substituent of the diorganosiloxane polymer is methyl.

3. A method according to claim 1, where each Q substituent of the diorganosiloxane polymer is hydroxy.

4. A method according to claim 1, where each R substituent of the diorganosiloxane polymer is methyl, x=10 to 1000, each Q substituent of the diorganosiloxane polymer is hydroxy and a equals two.

5. A method according to claim 1, where $R^2$ is a divalent hydrocarbon radical comprising one to 12 carbon atoms.

6. A method according to claim 1, where $R^2$ is ethylene.

7. A method according to claim 1, where $Q^1$ is described by formula $-R^2SiQ_{3-b}R_b$ and $R^2$ is ethylene, Q is methoxy, and b=0.

8. A method according to claim 1, where each $R^1$ is independently selected from a group consisting of methyl and hydrogen.

9. A method according to claim 1, where the hydrolyzable siloxane is a hydrolyzable cyclosiloxane and y is within a range of about four to six.

10. A method according to claim 1, where the tin salt catalyst is selected from a group consisting of dibutyltin dilaurate, dibutyltin dibenzoate, dibutyltin diacetate, and stannous(II) ethylhexanoate.

11. A method according to claim 1, where the tin salt catalyst is dibutyltin dilaurate.

12. A method according to claim 1, where the concentration of the tin salt catalyst is within a range of about 0.005 to 10 weight percent of the combined weight of the catalyst, the diorganosiloxane polymer, and the hydrolyzable siloxane.

13. A method according to claim 12, where the concentration of the tin salt catalyst is within a range of about 0.01 to 2 weight percent.

14. A method according to claim 1, where the mixture is cured in an environment having a relative humidity within a range of about 30 percent to 70 percent.

15. A method according to claim 1, where each R substituent of the diorganosiloxane polymer is methyl, x=30 to 800, each Q substituent of the diorganosiloxane polymer is hydroxy and a=2; each R substituent of the hydrolyzable siloxane is methyl, each $R^1$ is methyl, and $Q^1$ is described by formula $-R^2SiQ_{3-b}R_b$ where $R^2$ is ethylene, Q is methoxy, and b=0; and the hydrolyzable siloxane is added to the method at a concentration where the amount of Q substituents provided to the process by the hydrolyzable siloxane is about five to ten times stoichiometric excess in relation to the Q substituents added to the method by the diorganosiloxane.

16. An in situ reinforced silicone elastomer prepared by the method of claim 1.

17. An in situ reinforced silicone elastomer prepared by the method of claim 15.

* * * * *